United States Patent [19]
Izumi et al.

[11] Patent Number: 6,042,753
[45] Date of Patent: Mar. 28, 2000

[54] ACTIVE MATERIALS FOR THE POSITIVE ELECTRODE IN ALKALINE STORAGE BATTERIES

[75] Inventors: Hidekatsu Izumi; Hiroyuki Sakamoto, both of Neyagawa; Hirokazu Kimiya, Kyoto; Yoichi Izumi, Moriguchi; Isao Matsumoto, Osaka, all of Japan

[73] Assignee: Matsushita Electric Industrial Co., Ltd., Osaka, Japan

[21] Appl. No.: 09/165,131

[22] Filed: Oct. 2, 1998

[30] Foreign Application Priority Data

Oct. 6, 1996 [JP] Japan .................................. 9272371

[51] Int. Cl.⁷ ................................ H01B 1/02; H01B 1/06
[52] U.S. Cl. ........................ 252/521.2; 429/128; 429/218; 429/223
[58] Field of Search ................................. 252/513, 518.1, 252/519.1, 519.15, 521.2; 429/223, 128, 218, 224

[56] References Cited

U.S. PATENT DOCUMENTS

| | | | |
|---|---|---|---|
| 5,523,182 | 6/1996 | Voishinsky et al. | 429/223 |
| 5,567,549 | 10/1996 | Ovshinsky et al. | 429/223 |
| 5,861,225 | 1/1999 | Corrigan et al. | 429/223 |

FOREIGN PATENT DOCUMENTS

| | | |
|---|---|---|
| 0650207 | 4/1995 | European Pat. Off. . |
| 0727835 | 8/1996 | European Pat. Off. . |
| 0793285 | 9/1997 | European Pat. Off. . |
| 0833397 | 4/1998 | European Pat. Off. . |
| 62-222566 | 9/1987 | Japan . |
| 62-234867 | 10/1987 | Japan . |
| 350384 | 3/1991 | Japan . |
| 5174867 | 7/1993 | Japan . |
| 8287907 | 11/1996 | Japan . |
| 8329943 | 12/1996 | Japan . |
| 917428 | 1/1997 | Japan . |

OTHER PUBLICATIONS

Delmas, et al. Solid State Ionics, "Nickel Hydroxide and Derived Phases Obtained By Chimie Douce From $NaNiO_2$" vols. 32–33, pp. 104–111 (1989).

Faure, et al., J. Power Sources, "Preparation and Characterization of Cobalt–Substituted $\alpha$–Nickel Hydroxides Stable In KOH Medium Part I. $\alpha$'–Hydroxide with an Ordered Packing" vol. 35, pp. 249–261 (1991).

Faure, et al., J. Power Sources, "Infrared Characterization of Turbostratic $\alpha$–and Well Crystallized $\alpha$*–Cobalted Nickel Hydroxides" vol. 36, pp. 113–125 (1991).

Borthomieu, et al., Materials Science Forum, "Interstratification In the Substituted Nickel Hydroxides", vols. 152–153, pp. 201–204 (1994).

*Primary Examiner*—Yogendra Gupta
*Assistant Examiner*—Derrick G. Hamlin
*Attorney, Agent, or Firm*—Stevens, Davis, Miller & Mosher, L.L.P.

[57] ABSTRACT

Active materials for positive electrodes in alkaline storage batteries excellent in capacity density, discharge voltage, and high rate discharge characteristics can be provided by coating the surface of the active material powder with an $\alpha$-like Al-substituted $Ni(OH)_2$. Moreover, active materials excellent in capacity density, discharge voltage and high rate discharge characteristics, and besides in high-temperature charging efficiency and/or charge and discharge characteristics can be provided by dissolving in solid state and/or coprecipitated state at least one different metal element selected from Ca, Cr, Y, Ti and Co in the $\alpha$-like Al-substituted $Ni(OH)_2$ layer. Furthermore, active materials excellent in capacity density, discharge voltage and high rate discharge characteristics, and besides in charge and discharge characteristics can be provided by coating with a Co oxide the surface of the active material powder coated with the $\alpha$-like Al-substituted $Ni(OH)_2$.

7 Claims, No Drawings

ACTIVE MATERIALS FOR THE POSITIVE ELECTRODE IN ALKALINE STORAGE BATTERIES

BACKGROUND OF THE INVENTION

1. Field of the Invention

The present invention relates to an improvement of active materials for positive electrodes in alkaline storage batteries.

2. Description of the Related Art

Since alkaline storage batteries, particularly small-sized sealed batteries, are superior to other battery systems in charge and discharge characteristics, cycle life and stability and reliability, and are well-balanced in these properties, they have considerably spread as main electric sources of various portable devices represented by mobile communication devices and personal computers. In addition, since they are also markedly excellent in charge and discharge characteristics and reliability as large electric sources, they are noticed as locomotive main electric sources such as for electric vehicles. Battery systems representing alkaline storage batteries are nickel-cadmium storage batteries which have been used for a long period of time, but nickel-metal hydride storage batteries in which a negative electrode of a hydrogen-storing alloy is used in place of cadmium negative electrode have been industrialized to attain a high energy density. Moreover, as to electrode supports, three-dimensional foamed nickel porous bodies of high porosity (more than 95%) filled with a nickel oxide at a high density (sponge metal nickel electrode: SME) have been industrialized in place of sintered electrodes to realize a high energy density. In this way, hitherto, with respect to alkaline storage batteries, investigation has been made mainly on miniaturization, saving in weight, and increase of energy density.

On the other hand, when application of alkaline storage batteries to electric vehicles, electric power tools and the like is considered, an important task is increase in output of batteries, namely, improvement of working voltage in high rate discharging. Furthermore, many of portable devices work under constant power discharging, and they are in the state of high rate discharging at the end of discharging at which discharge voltage decreases to cause further decrease of discharge voltage. Therefore, improvement of working voltage is also an important task in small-sized sealed alkaline storage batteries.

As a means for solving the task, JP-A-5-174867 proposes to add 0.3–3.5 N of at least one hydroxide selected from rubidium hydroxide and cesium hydroxide to an alkaline electrolyte. By the addition of these compounds, conductivity of the electrolyte is improved and rubidium ion and cesium ion act as catalysts, and thus the working voltage at high rate discharging can be increased. However, use of the expensive materials such as rubidium and cesium in actual batteries is difficult and has not yet been industrialized.

U.S. Pat. No. 5,567,549 (1996) discloses an active material for positive electrodes in alkaline storage batteries which comprises $Ni(OH)_2$ in which Al is dissolved to form a solid solution. This technique is such that when Al is dissolved in $Ni(OH)_2$ to form a solid solution, $\alpha$-$Ni(OH)_2$ phase is stabilized and this $\alpha$-phase containing multi-phase $Ni(OH)_2$ in which Al is dissolved in the state of solid solution performs a reaction of higher order, whereby capacity of the batteries can be increased.

It has been reported that $\alpha$-like $Ni(OH)_2$ is obtained by replacing a part of Ni of $Ni(OH)_2$ with a metallic atom of higher valence such as Co(III), Mn(III), Fe(III) or the like ("Solid State Ionics", 32/33, p. 104(1989), "J. Power Sources", 35, p. 249(1991)). It has been considered that owing to the dissolution of a metallic atom of higher valence in solid state, the nickel plate layer in the crystal structure is positively charged and anion species (such as $PO_4^{3-}$, $SO_4^{2-}$, $CO_3^{2-}$ and $NO_3^-$) enter between layers as charge compensation, resulting in a structure of the space between the layers being extended ("J. Power Sources", 36, p. 113(1991), "Materials Science Forum", 152–153, p. 201 (1994)).

Further, improvement of charge and discharge characteristics by the dissolution of Co and Cd in $Ni(OH)_2$ in the state of solid solution is disclosed in Japanese Patent No.1827639 (1984) and JP-A-3-50384.

Furthermore, many reports have been made on the improvement of characteristics by coating treatment of active materials for positive electrodes. For example, JP-A-62-222566 and JP-A-62-234867 disclose that utilization ratio can be improved by coating the surface of particles of $Ni(OH)_2$ or those mainly composed of $Ni(OH)_2$ with a Co compound. JP-A-9-17428 reports that utilization ratio can be improved and discharge capacity can be increased by coating the surface of particles of $Ni(OH)_2$ or those mainly composed of $Ni(OH)_2$ with a Co and/or Ni additive. Moreover, JP-A-8-287907 discloses that alkaline storage batteries of high capacity and long life can be provided by using an active material for positive electrode prepared by coating the surface of particles of $Ni(OH)_2$ or those mainly composed of $Ni(OH)_2$ with a first compound layer mainly composed of a compound of Group II element and further coating the surface with a second compound layer mainly composed of a Co compound. In addition, JP-A-8-329943 discloses that alkaline storage batteries enhanced in utilization ratio, particularly utilization ratio at high temperatures can be provided by using an active material for positive electrodes which is prepared by dissolving Ca in $Ni(OH)_2$ particles in the state of solid solution and simultaneously coating and impregnating the surface and pores of the $Ni(OH)_2$ particles with at least a part of the contained Ca in the form of $Ca(OH)_2$. However, no report has been made on the improvement of discharge voltage and high rate discharge characteristics by coating treatment of the active material s for positive electrodes.

BRIEF SUMMARY OF THE INVENTION

We have made a study on the effect of adding Al to $Ni(OH)_2$ to find that the effects of improvement in discharge voltage and high rate discharge characteristics in addition to those disclosed in U.S. Pat. No. 5,567,549 can be obtained by adding Al to $Ni(OH)_2$ in the state of solid solution and/or coprecipitated state (hereinafter referred to as "Al-substituted $Ni(OH)_2$") It has been found that, especially, a conspicuous effect is obtained in the case of using Al-substituted $Ni(OH)_2$ showing a peak attributed to $\alpha$-Ni $(OH)_2$ in the X-ray diffraction pattern (hereinafter referred to as "$\alpha$-like Al-substituted $Ni(OH)_2$"). However, it has become clear that the $\alpha$-like $Ni(OH)_2$ has the structure mentioned above and hence is high in bulkiness and difficult to be filled at high density, and for this reason, when the $\alpha$-like Al-substituted $Ni(OH)_2$ is used as an active material, discharge voltage, high rate discharge characteristics and utilization ratio can be markedly improved, but packing density is very low and it cannot be used as an active material for positive electrode in alkaline storage batteries.

Accordingly, an object of the present invention is to provide an active material for positive electrode in alkaline storage batteries which is high in capacity density and excellent in discharge voltage and high rate discharge characteristics.

According to one preferred embodiment of the present invention, in an active material powder used for positive electrode in alkaline storage batteries which is mainly composed of a metal oxide (or metal hydroxide) comprising Ni as a main metal element, there is provided an α-like $Ni(OH)_2$ layer in which Al is present in the state of solid solution and/or coprecipitated state on the surface of the metal oxide (or metal hydroxide) powder. This α-like Al-substituted $Ni(OH)_2$ layer has actions to improve discharge voltage and high rate discharge characteristics. The α-like Al-substituted $Ni(OH)_2$ is essentially high in bulkiness and is difficult to pack at high density, but since it is provided only at the surface layer, reduction in packing density can be inhibited and a high capacity density can be maintained. Moreover, when at least one element selected from Ca, Cr, Y, Ti and Co is added in the state of solid solution and/or coprecipitated state to the α-like Al-substituted $Ni(OH)_2$ coating layer, there is obtained an active material for positive electrodes in alkaline storage batteries which is excellent in discharge voltage, high rate discharge characteristics and high density packing and, furthermore, charging efficiency at high temperatures and/or charge and discharge characteristics. Moreover, when the surface of the active material powder coated with the α-like Al-substituted $Ni(OH)_2$ is further coated with a Co oxide layer, there is obtained an active material for positive electrodes in alkaline storage batteries which is excellent in discharge voltage, high rate discharge characteristics and high density packing and besides in charge and discharge characteristics.

Other objects of the present invention will become apparent from the following detailed description.

DETAILED DESCRIPTION OF THE INVENTION

The active material for positive electrode of the present invention comprises an active material powder containing a metal oxide or metal hydroxide containing Ni as a main metallic element and an α-like $Ni(OH)_2$ layer containing Al in the state of solid solution and/or coprecipitated state which is formed on the surface of the powder.

The present invention is characterized in that α-like Al-substituted $Ni(OH)_2$ is not present inside the active material particles for positive electrode, but is provided on the surface of the active material particles. By employing such construction, the active material for positive electrode can be filled at a high density.

Preferably, the whole surface of the active material is covered with the α-like Al-solid $Ni(OH)_2$ layer, but a part of the surface may not be covered with the layer.

The metal oxides or metal hydroxides containing Ni as a main metal element of the present invention may contain at least one metal element selected from the group consisting of Cd, Co, Mn, Cr, Zn, Ba and Ca in the state of solid solution and/or coprecipitated state.

Amount of Al which is present in the α-like $Ni(OH)_2$ layer in the state of solid solution and/or coprecipitated state is preferably in the range of $0.10 \leq x \leq 0.40$ when the metallic atom ratio in the α-like $Ni(OH)_2$ layer is expressed by Ni:Al=1−x:x. In this case, there can be provided an active material for positive electrodes in alkaline storage batteries which is high in capacity density and excellent in discharge voltage and high rate discharge characteristics.

Furthermore, in the active material for positive electrodes according to the present invention, the α-like $Ni(OH)_2$ layer provided on the surface layer of the metal oxide or metal hydroxide powder may contain, in addition to Ni and Al, at least one element selected from Ca, Cr, Y, Ti and Co in the state of solid solution and/or coprecipitated state.

When at least one element selected from Ca, Cr, Y, Ti and Co mentioned above is denoted by Me, amount of Me which is present in the α-like $Ni(OH)_2$ layer in the state of solid solution and/or coprecipitated state is preferably in the range of $0.01 \leq y \leq 0.20$ when the metallic atom ratio in the α-like $Ni(OH)_2$ coating layer is expressed by Ni+Al:Me=1−y:y. In this case, there can be provided an active material for positive electrodes in alkaline storage batteries which is excellent in capacity density, discharge voltage and high rate discharge characteristics and besides in charging efficiency at high temperatures and/or charge and discharge characteristics.

Moreover, the active material for positive electrodes of the present invention may further comprise a Co oxide layer formed on the surface of the α-like $Ni(OH)_2$ layer. By employing such construction, there can be provided an active material for positive electrodes in alkaline storage batteries which is excellent in capacity density, discharge voltage and high rate discharge characteristics and besides in charge and discharge characteristics.

Preferably, the whole surface of the α-like $Ni(OH)_2$ layer is covered with the layer, but a part of the surface may not be covered with the layer.

Examples of the present invention will be explained below, but the invention is never limited to these examples.

EXAMPLE 1

First, investigation was made on the effect of the coating of the α-like Al-substituted $Ni(OH)_2$ on the surface of active material for positive electrodes.

(1) Aqueous $NiSO_4$ solution, aqueous NaOH solution and aqueous $NH_3$ solution were continuously fed to a reaction vessel at a constant flow rate and were stirred and mixed keeping the temperature in the reaction vessel at 30° C. and pH at about 11 to grow $Ni(OH)_2$ particles. The collected $Ni(OH)_2$ particles were washed with water and dried to obtain a conventional $Ni(OH)_2$ powder A.

(2) A conventional Co,Cd-substituted $Ni(OH)_2$ powder B was obtained in the same manner as above using a mixed aqueous solution of $Ni(NO_3)_2$, $Co(NO_3)_2$ and $Cd(NO_3)_2$ (Ni:Co:Cd=0.94:0.03:0.03 in atomic ratio).

(3) The conventional $Ni(OH)_2$ powder A was placed in a reaction vessel and a mixed aqueous solution of $NiSO_4$ and $Al_2(SO_4)_3$ (Ni:Al=0.80:0.20 in atomic ratio), aqueous NaOH solution and aqueous $NH_3$ solution were continuously fed to the reaction vessel at a constant flow rate and were stirred and mixed keeping the temperature in the reaction vessel at 30° C. and pH at about 11 to precipitate Al-substituted $Ni(OH)_2$ on the surface of the $Ni(OH)_2$ particles to coat the surface of the particles. The collected particles were washed with water and dried to obtain $Ni(OH)_2$ powder C coated with Al-substituted $Ni(OH)_2$.

(4) The conventional Co,Cd-substituted $Ni(OH)_2$ powder B was subjected to the same coating treatment as above to obtain Co,Cd-substituted $Ni(OH)_2$ powder D coated with Al-substituted $Ni(OH)_2$.

Existence of Al in the above coating layers of the powder C and the powder D was confirmed by Al characteristic X-ray dot map of the section of the powder. Furthermore, only the peak attributed to β-Ni(OH)$_2$ appeared in the X-ray diffraction patterns of powders A and B while an additional peak attributed to α-Ni(OH)$_2$ appeared in the X-ray diffraction patterns of the coated powders C and D. Thus, it was confirmed that the coating layer contained α-like Al-substituted Ni(OH)$_2$ phase. The coated powders had a good tap density of 1.9–2.0 g/cc.

To 100 g of the powder prepared above were added 10 g of Co(OH)$_2$ powder, 0.5 g of polytetrafluoroethylene (PTFE) powder and 42 g of water, followed by kneading them to prepare a paste. This paste was filled in a foamed nickel substrate of 95% in porosity, dried and subjected to pressure molding to obtain a nickel positive electrode plate having a thickness of 0.7 mm and a capacity density of about 630 mAh/cc. The resulting positive electrode plate was cut to 39×75 mm, and an electrode lead was spot welded to a lead connecting portion previously provided at the substrate to obtain a nickel positive electrode of 1300 mAh in theoretical capacity.

As the negative electrode was used a hydrogen-storing alloy negative electrode (MmNi$_{3.8}$Co$_{0.5}$Mn$_{0.4}$Al$_{0.3}$) having a sufficiently high capacity for the positive electrode. The hydrogen-storing alloy used was obtained by arc melting Mm, Ni, Co, Mn and Al mixed at the desired ratio. This alloy ingot was ground in a ball mill in an inert atmosphere to obtain a powder of 30 μm in average particle size. Thereto was added carboxymethylcellulose (CMC) as a binder, followed by kneading them. The kneaded product was filled in an electrode support under application of pressure to obtain a hydrogen-storing negative electrode plate having a thickness of 0.45 mm and a capacity density of 1350 mAh/cc. This negative electrode plate was cut to 39×100 mm to obtain a negative electrode of 2400 mAh in theoretical capacity.

A spiral electrode group was made using the above positive electrode, the above negative electrode and a separator of 0.15 mm thick comprising a sulfonated polypropylene nonwoven fabric interposed between the positive electrode and the negative electrode. This electrode group was inserted in an outer case. A mixed alkaline aqueous solution comprising 7.2 mol/l KOH+1.0 mol/l LiOH as an electrolyte was poured into the outer case in which the electrode group was inserted. The case was sealed by a sealing material having a safety valve of 20 kgf/cm$^2$ in working pressure thereby to make a cylindrical sealed nickel-metal hydride storage battery of AA size having a nominal capacity of 1300 mAh.

This battery was evaluated by subjecting to charge and discharge test. The charging was carried out at 0.1 C. for 15 hours and the discharging was carried out at 1.0 C. until a cut-off voltage of 1.0 V at an atmospheric temperature of 20° C. Since several cycles were required before activation of the battery was completed, the average discharge voltage and utilization ratio at 10th cycle were employed as comparative values. The utilization ratio here is the ratio of the measured capacity at 1.0 C. to the theoretical capacity of the positive electrode, which is expressed by %. The results are shown in Table 1.

TABLE 1

| | Ratio of metal atoms in internal particles | | Ratio of Al atom in coating layer | Average discharge voltage/V | Utilization ratio/% |
|---|---|---|---|---|---|
| | Co / (Ni + Co + Cd) | Cd / (Ni + Co + Cd) | Al / (Ni + Al) | (1.0 C, 20° C.) | (1.0 C, 20° C.) |
| A | — | — | — | 1.19 | 84.4 |
| B | 0.03 | 0.03 | — | 1.20 | 86.2 |
| C | — | — | 0.20 | 1.23 | 85.1 |
| D | 0.03 | 0.03 | 0.20 | 1.24 | 87.7 |

It was recognized that the Ni(OH)$_2$ powder C subjected to the coating treatment with α-like Al-substituted Ni(OH)$_2$ was improved in discharge voltage by 40 mV as compared with the conventional Ni(OH)$_2$ powder A which was not subjected to the coating treatment. It was further recognized that the Co,Cd-substituted Ni(OH)$_2$ powder subjected to the coating treatment with α-like Al-substituted Ni(OH)$_2$, powder D was improved in discharge voltage by 40 mV as compared with the conventional Co,Cd-substituted Ni(OH)$_2$ powder B which was not subjected to the coating treatment. From these results, it is clear that the discharge voltage can be improved by the coating treatment with α-like Al-substituted Ni(OH)$_2$.

Moreover, when the powder A was compared with the powder B, the utilization ratio of the powder B in which Co and Cd were dissolved in the state of solid solution was higher and the powder B was superior in charge and discharge characteristics. The similar results were recognized when the powders C and D subjected to the coating treatment with α-like Al-substituted Ni(OH)$_2$ were compared. Therefore, it is clear that the coating treatment with α-like Al-substituted Ni(OH)$_2$ can improve discharge voltage without damaging internal particle characteristics.

EXAMPLE 2

In order to obtain a proper value of the amount of Al in the α-like Al-substituted Ni(OH)$_2$ coating layer, the conventional Ni(OH)$_2$ powder A used in Example 1 was charged in a reaction vessel and subjected to the same coating treatment as in Example 1 using various mixed aqueous solutions of NiSO$_4$ and Al$_2$(SO$_4$)$_3$ (Ni:Al=1–x:x where x=0.05, 0.10, 0.30, 0.40 and 0.45 in atomic ratio) to obtain Ni(OH)$_2$ powders E–I coated with Al-substituted Ni(OH)$_2$. The coated powders had a good tap density of 1.8–2.0 g/cc. Batteries were made in the same manner as in Example 1 using the resulting powders E–I and evaluated by the same charge and discharge test as in Example 1. The results are shown in Table 2.

TABLE 2

| | Ratio of Al atom in coating layer Al / (Ni + Al) | Average discharge voltage/V (1.0 C, 20° C.) | Utilization ratio/% (1.0 C, 20° C.) |
|---|---|---|---|
| E | 0.05 | 1.19 | 84.0 |
| F | 0.10 | 1.21 | 83.7 |
| C | 0.20 | 1.23 | 85.1 |
| G | 0.30 | 1.23 | 84.7 |
| H | 0.40 | 1.22 | 82.7 |
| I | 0.45 | 1.22 | 71.1 |

The effect of improvement in the discharge voltage was recognized when the ratio of Al in the coating layer was 0.10–0.45 while it was not recognized when the ratio was 0.05. In the X-ray diffraction patterns of the coated powders C and F–I, the peak attributed to α-Ni(OH)$_2$ appeared while no peak attributed to α-Ni(OH)$_2$ appeared in the X-ray diffraction pattern of the coated powder E. That is, it can be presumed that since the coating layers of the coated powders C and F–I contained the α-like Al-substituted Ni(OH)$_2$ phase, the discharge voltage was improved while since the coating layer of the coated powder E did not contain the α-like Al-substituted Ni(OH)$_2$ phase, the effect of improving the discharge voltage was not exhibited. However, in the case of the coated powder I of 0.45 in the ratio of Al contained, reduction of utilization ratio was recognized and there was a problem in capacity density.

From the above, the effect of improving the discharge voltage is obtained by the coating treatment with α-like Al-substituted Ni(OH)$_2$ and the ratio of Al dissolved in the state of solid solution is preferably 0.10–0.40 in the ratio of the number of Al atom to the total atom number of Ni and Al in the coating layer.

EXAMPLE 3

Next, the effect of dissolving other different metals in the state of solid solution in α-like Al-substituted Ni(OH)$_2$ coating layer was examined.

(1) The conventional Ni(OH)$_2$ powder A was charged in a reaction vessel and subjected to the same coating treatment as in Example 1 using a mixed aqueous solution of Ni(NO$_3$)$_2$, Al(NO$_3$)$_3$ and Ca(NO$_3$)$_2$ (Ni:Al:Ca=0.75:0.20:0.05 in atomic ratio) to obtain Ni(OH)$_2$ powder J coated with Al,Ca-substituted Ni(OH)$_2$.

(2) The conventional Ni(OH)$_2$ powder A was charged in a reaction vessel and subjected to the same coating treatment as in Example 1 using a mixed aqueous solution of Ni(NO$_3$)$_2$, Al(NO$_3$)$_3$ and Cr(NO$_3$)$_3$ (Ni:Al:Cr=0.75:0.20:0.05 in atomic ratio) to obtain Ni(OH)$_2$ powder K coated with Al,Cr-substituted Ni(OH)$_2$.

(3) The conventional Ni(OH)$_2$ powder A was charged in a reaction vessel and subjected to the same coating treatment as in Example 1 using a mixed aqueous solution of Ni(NO$_3$)$_2$, Al(NO$_3$)$_3$ and Y(NO$_3$)$_3$ (Ni:Al:Y=0.75:0.20:0.05 in atomic ratio) to obtain Ni(OH)$_2$ powder L coated with Al,Y-substituted Ni(OH)$_2$.

(4) The conventional Ni(OH)$_2$ powder A was charged in a reaction vessel and subjected to the same coating treatment as in Example 1 using a mixed aqueous solution of NiCl$_2$, AlCl$_3$ and TiCl$_3$ (Ni:Al:Ti=0.75:0.20:0.05 in atomic ratio) to obtain Ni(OH)$_2$ powder M coated with Al,Ti-substituted Ni(OH)$_2$.

(5) The conventional Ni(OH)$_2$ powder A was charged in a reaction vessel and subjected to the same coating treatment as in Example 1 using a mixed aqueous solution of NiSO$_4$, Al$_2$(SO$_4$)$_3$ and CoSO$_4$ (Ni:Al:Co=0.75:0.20:0.05 in atomic ratio) to obtain Ni(OH)$_2$ powder N coated with Al,Co-substituted Ni(OH)$_2$.

(6) The conventional Co,Cd-substituted Ni(OH)$_2$ powder B was charged in a reaction vessel and subjected to the same coating treatment as in Example 1 using a mixed aqueous solution of Ni(NO$_3$)$_2$, Al(NO$_3$)$_3$ and Ca(NO$_3$)$_3$ (Ni:Al:Ca=0.75:0.20:0.05 in atomic ratio) to obtain Co,Cd-substituted Ni(OH)$_2$ powder O coated with Al,Ca-substituted Ni(OH)$_2$.

(7) The conventional Ni(OH)$_2$ powder A was charged in a reaction vessel and subjected to the same coating treatment as in Example 1 using a mixed aqueous solution of Ni(NO$_3$)$_2$, Al(NO$_3$)$_3$, Ca(NO$_3$)$_2$ and Co(NO$_3$)$_2$ (Ni:Al:Ca:Co=0.74:0.20:0.03:0.03 in atomic ratio) to obtain Ni(OH)$_2$ powder P coated with Al,Ca,Co-substituted Ni(OH)$_2$.

(8) The conventional Co,Cd-substituted Ni(OH)$_2$ powder B was charged in a reaction vessel and subjected to the same coating treatment as in Example 1 using a mixed aqueous solution of Ni(NO$_3$)$_2$, Al(NO$_3$)$_3$, Cr(NO$_3$)$_3$ and Co(NO$_3$)$_2$ (Ni:Al:Cr:Co=0.74:0.20:0.03:0.03 in atomic ratio) to obtain Co,Cd-substituted Ni(OH)$_2$ powder Q coated with Al,Cr,Co-substituted Ni(OH)$_2$.

A peak attributed to α-Ni(OH)$_2$ appeared in the X-ray diffraction patterns of all of these coated powders, and, as a result, it was confirmed that the coating layers contained α-like Al- and other metals-substituted Ni(OH)$_2$ phase. The coated powders had a good tap density of 1.9–2.0 g/cc.

Batteries were made in the same manner as in Example 1 using the resulting powders J–Q and evaluated by the same charge and discharge test as in Example 1. In addition, high-temperature charging efficiency was evaluated by carrying out charging at 0.1 C. for 15 hours in an atmosphere of 45° C. and subsequently carrying out discharging at 1.0 C. until a cut-off voltage of 1.0 V in an atmosphere of 20° C. The results are shown in Table 3.

TABLE 3

| | Ratio of meatl atoms in internal particles | | Ratio of metal atoms in coating layer | Average discharge voltage /V (1.0 C, 20° C.) | Utilization ratio/% (1.0 C, 20° C.) | Utilization ratio/% (1.0 C, 20° C.) |
|---|---|---|---|---|---|---|
| | Co / (Ni + Co + Cd) | Cd / (Ni + Co + Cd) | Me / (Ni + Al + Me) | | | |
| C | — | — | — | 1.23 | 85.1 | 57.0 |
| J | — | — | Ca 0.05 | 1.24 | 86.4 | 69.1 |
| K | — | — | Cr 0.05 | 1.22 | 84.3 | 65.0 |
| L | — | — | Y 0.05 | 1.24 | 83.6 | 63.2 |
| M | — | — | Ti 0.05 | 1.23 | 82.1 | 61.4 |
| N | — | — | Co 0.05 | 1.22 | 93.0 | 61.4 |
| D | 0.03 | 0.03 | — | 1.24 | 87.7 | 65.8 |
| O | 0.03 | 0.03 | Ca 0.05 | 1.24 | 88.5 | 73.5 |
| P | — | — | Ca 0.03 + Co 0.03 | 1.22 | 91.8 | 63.4 |
| Q | 0.03 | 0.03 | Cr 0.03 + Co 0.03 | 1.22 | 90.4 | 68.4 |

The effect of improvement in discharge voltage was recognized in all of these coated powders. Furthermore, improvement of high-temperature charging efficiency was recognized in the powders J, K, L, M and O in which Ca, Cr, Y and Ti were dissolved in the state of solid solution in the α-like Al-substituted Ni(OH)$_2$ coating layer as compared with in the α-like Al-substituted Ni(OH)$_2$ powders C and D in which these metals were not dissolved.

Moreover, improvement in the utilization ratio was recognized in the powder N in which Co was dissolved in the state of solid solution in the α-like Al-substituted Ni(OH)$_2$ coating layer as compared with in the α-like Al-substituted Ni(OH)$_2$ powder C in which Co was not dissolved.

Further, improvement of high-temperature charging efficiency and utilization ratio was recognized in the powders P and Q in which Ca and Co or Cr and Co were dissolved in the state of solid solution in the α-like Al-substituted Ni(OH)$_2$ coating layer as compared with in the α-like Al-substituted Ni(OH)$_2$ powders C and D in which the above metals were not dissolved.

From the above results, it is clear that the discharge voltage and, besides, other characteristics can be improved by coating on Ni(OH)$_2$ particles the α-like Al-substituted Ni(OH)$_2$ in which the above different metal elements are dissolved in the state of solid solution.

EXAMPLE 4

In order to obtain a proper value of the amount of the different metal elements in the α-like Al-substituted Ni(OH)$_2$ coating layer, the conventional Ni(OH)$_2$ powder A used in Example 1 was charged in a reaction vessel and subjected to the same coating treatment as in Example 1 using various mixed aqueous solutions of Ni(NO$_3$)$_2$, Al(NO$_3$)$_3$ and Ca(NO$_3$)$_2$ (Ni:Al:Ca=1−y:0.20:y where y=0.01, 0.05, 0.10, 0.20 and 0.25 in atomic ratio) to obtain Ni(OH)$_2$ powders R–U coated with Al,Ca-substituted Ni(OH)$_2$.

A peak attributed to α-Ni(OH)$_2$ appeared in the X-ray diffraction patterns of all of these coated powders, and, as a result, it was confirmed that the coating layers contained α-like Al,Ca-substituted Ni(OH)$_2$ phase. The coated powders had a good tap density of 1.8–1.9 g/cc.

Batteries were made in the same manner as in Example 1 using the resulting powders R–U and evaluated by the same charge and discharge test as in Example 1. The results are shown in Table 4.

TABLE 4

| | Ratio of Ca atom in coating layer Ca Ni + Al + Ca | Average discharge voltage/V (1,0 C, 20° C.) | Utilization ratio/% (1.0 C, 20° C.) | Utilization ratio/% (1.0 C, 20° C.) |
|---|---|---|---|---|
| C | — | 1.23 | 85.1 | 57.0 |
| R | 0.01 | 1.23 | 84.7 | 61.8 |
| J | 0.05 | 1.24 | 86.4 | 69.1 |
| S | 0.10 | 1.23 | 87.2 | 68.8 |

TABLE 4-continued

| | Ratio of Ca atom in coating layer Ca Ni + Al + Ca | Average discharge voltage/V (1,0 C, 20° C.) | Utilization ratio/% (1.0 C, 20° C.) | Utilization ratio/% (1.0 C, 20° C.) |
|---|---|---|---|---|
| T | 0.20 | 1.22 | 85.7 | 62.1 |
| U | 0.25 | 1.18 | 81.2 | 52.5 |

The effect of improvement in high-temperature charging efficiency was recognized when the ratio of Ca dissolved in the state of solid solution in the α-like Al,Ca-substituted Ni(OH)$_2$ coating layer was 0.01–0.20. However, when the ratio of Ca dissolved in the coating layer was 0.25, no effects were recognized in both the discharge voltage and the high-temperature charging efficiency. The reason is not clear why the discharge voltage was not improved in spite of the fact that the coating layer contained the α-like Al,Ca-substituted Ni(OH)$_2$ phase. However, the similar effects were obtained on all of the different metals dissolved in the state of solid solution in the α-like Al-substituted Ni(OH)$_2$ layer in Example 3. Thus, improvement of the characteristics was recognized in the range of 0.01–0.20 in terms of the ratio of the metal dissolved.

From the above results, it is clear that when different metal element is dissolved in the state of solid solution in the α-like Al-substituted Ni(OH)$_2$ layer at a ratio of 0.01–0.20, the discharge voltage and, besides, the other characteristics can be improved.

EXAMPLE 5

Investigation was made on the effect of coating a Co oxide on the surface of active material for positive electrodes which was coated with the α-like Al-substituted Ni(OH)$_2$.

Each of the powders C, D, J and O coated with the α-like Al-substituted Ni(OH)$_2$ was charged in a reaction vessel and aqueous CoSO$_4$ solution, aqueous NaOH solution and aqueous NH$_3$ solution were continuously fed to the reaction vessel at a constant flow rate and were stirred and mixed keeping the temperature in the reaction vessel at 30° C. and pH at about 11 to precipitate Co(OH)$_2$ on the surface of the particles to coat the surface with Co(OH)$_2$. The collected particles were washed with water and dried to obtain powders V–Y.

Presence of Co in the coating layer of the powder was confirmed by Co characteristic X-ray dot map. The coated powders had a good tap density of 1.8–2.0 g/cc.

Batteries were made in the same manner as in Example 1 using the resulting powders V–Y and evaluated by the same charge and discharge test as in Example 1. The results are shown in Table 5.

TABLE 5

| | Ratio of metal atoms in internal particles | | Ratio of Ca atoms in intermediate layer | Surface coat $Co(OH)_2$ | Average discharge voltage/V (1.0 C, 20° C.) | Utilization ratio/% (1.0 C, 20° C.) |
|---|---|---|---|---|---|---|
| | Co / (Ni+Co+Cd) | Cd / (Ni+Co+Cd) | Ca / (Ni+Al+Ca) | | | |
| A | — | — | — | — | 1.19 | 84.4 |
| B | 0.03 | 0.03 | — | — | 1.20 | 86.2 |
| C | — | — | — | — | 1.23 | 85.1 |
| D | 0.03 | 0.03 | — | — | 1.24 | 87.7 |
| J | — | — | 0.05 | — | 1.24 | 86.4 |
| O | 0.03 | 0.03 | 0.05 | — | 1.24 | 88.5 |
| V | — | — | — | ○ | 1.22 | 89.6 |
| W | 0.03 | 0.03 | — | ○ | 1.21 | 93.4 |
| X | — | — | 0.05 | ○ | 1.22 | 91.4 |
| Y | 0.03 | 0.03 | 0.05 | ○ | 1.22 | 94.3 |

The powders V–Y coated with $Co(OH)_2$ were recognized to be improved in utilization ratio as compared with uncoated powders C, D, J, and O. The discharge voltage slightly decreased, but was improved as compared with the uncoated powders A and B. Thus, the effect of improvement in discharge voltage by the coating treatment of α-like Al-substituted $Ni(OH)_2$ with $Co(OH)_2$ was recognized.

It is clear from the results of this Example that the utilization ratio can be improved and besides the discharge voltage can be improved by providing an α-like Al-substituted $Ni(OH)_2$ layer between the surface of the active material particles for positive electrodes and Co oxide layer present on the surface of the active material particles.

Since the present invention relates to a technique for the improvement of active material for positive electrodes in alkaline storage batteries, the similar effects can also be obtained in nickel-metal hydride storage batteries which use hydrogen-storing alloys having compositions other than those mentioned in the above Examples. Furthermore, the present invention can provide the similar effects in all alkaline storage batteries using active materials for positive electrode which are mainly composed of nickel oxides (for example, nickel-cadmium storage batteries, nickel-iron storage batteries, and nickel-zinc storage batteries). Moreover, the similar effects are obtained in the case of using other electrode supports, additives to the active materials and separators. In addition, only cylindrical sealed batteries of AA size are referred to above, but the similar effects can be obtained in cylindrical sealed batteries of other sizes, rectangular sealed batteries, stationary batteries, large-sized storage batteries, medium-sized storage batteries and open type batteries. Further, the similar effects can also be obtained in alkaline storage batteries which use sintered positive electrodes if the surface of the positive electrodes is subjected to the same coating treatment as in the present invention.

What is claimed is:

1. An active material for positive electrodes in alkaline storage batteries which comprises an active material powder containing a metal oxide or metal hydroxide containing Ni as a main metal element and an Al substituted $Ni(OH)_2$ showing a peak attributed to α-$Ni(OH)_2$ in an x-ray diffraction pattern layer containing Al in the state of solid solution and/or coprecipitated state, said layer being formed on the surface of the powder.

2. An active material for positive electrodes in alkaline storage batteries according to claim 1, wherein the amount of Al is in the range of $0.10 \leq x \leq 0.40$ when the metallic atom ratio in the α-like $Ni(OH)_2$ layer is expressed by Ni:Al=1−x:x.

3. An active material for positive electrodes in alkaline storage batteries according to claim 1, wherein the α-like $Ni(OH)_2$ layer additionally contains at least one element selected from Ca, Cr, Y, Ti and Co in the state of solid solution and/or coprecipitated state.

4. An active material for positive electrodes in alkaline storage batteries according to claim 3, wherein the amount of at least one element (Me) selected from Ca, Cr, Y, Ti and Co is in the range of $0.01 \leq y \leq 0.20$ when the metallic atom ratio in the α-like $Ni(OH)_2$ layer is expressed by Ni+Al:Me=1−y:y.

5. An active material for positive electrodes in alkaline storage batteries according to claim 1 which additionally comprises a Co oxide layer formed on the surface of the α-like $Ni(OH)_2$ layer.

6. A positive electrode for alkaline storage batteries which uses the active material for positive electrodes of claim 1.

7. An alkaline storage battery which uses the positive electrode for alkaline storage batteries of claim 6.

* * * * *

UNITED STATES PATENT AND TRADEMARK OFFICE
CERTIFICATE OF CORRECTION

PATENT NO.     : 6,042,753
DATED          : March 28, 2000
INVENTOR(S)    : Izumi et al.

It is certified that error appears in the above-identified patent and that said Letters Patent is hereby corrected as shown below:

<u>Title page,</u>
Item [30] should read as follows:
-- [30] Foreign Application Priority Data
     Oct. 6, 1996 [JP] Japan..................................9-272371 not 9272371 --

Signed and Sealed this

Twenty-sixth Day of February, 2002

Attest:

Attesting Officer

JAMES E. ROGAN
Director of the United States Patent and Trademark Office